United States Patent
Seki et al.

(10) Patent No.: US 9,710,899 B2
(45) Date of Patent: Jul. 18, 2017

(54) IMAGE PROCESSING DEVICE, INSPECTION DEVICE, IMAGE PROCESSING METHOD, AND NON-TRANSITORY RECORDING MEDIUM

(71) Applicant: KABUSHIKI KAISHA TOSHIBA, Tokyo (JP)

(72) Inventors: Akihito Seki, Kanagawa (JP); Takaaki Kuratate, Kanagawa (JP); Norihiro Nakamura, Kanagawa (JP); Masaki Yamazaki, Tokyo (JP); Ryo Nakashima, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/922,333

(22) Filed: Oct. 26, 2015

(65) Prior Publication Data

US 2016/0125612 A1 May 5, 2016

(30) Foreign Application Priority Data

Oct. 31, 2014 (JP) .................................. 2014-223225

(51) Int. Cl.
*G06T 7/00* (2017.01)
*G06K 9/00* (2006.01)
(Continued)

(52) U.S. Cl.
CPC ........ *G06T 7/0002* (2013.01); *G06K 9/00671* (2013.01); *G06K 9/00798* (2013.01); *G06K 9/78* (2013.01); *G06T 3/0018* (2013.01)

(58) Field of Classification Search
None
See application file for complete search history.

(56) References Cited

U.S. PATENT DOCUMENTS

| 2006/0098843 A1* | 5/2006 | Chew | B61K 9/08 382/103 |
| 2009/0169052 A1* | 7/2009 | Seki | G06T 7/74 382/103 |

(Continued)

FOREIGN PATENT DOCUMENTS

| JP | 2001-201455 | 7/2001 |
| JP | 2002-005850 | 1/2002 |

(Continued)

OTHER PUBLICATIONS

Partial Search Report mailed Apr. 5, 2016 in counterpart European Patent Application No. 15191976.8.
Vemuri, B.C. et al., "Lossless Image Compression." Encyclopedia of Optical Engineering, Jan. 1, 2002, pp. 1-30.
Ahamed, T. et al., "Tower remote-sensing system for monitoring energy crops; image acquisition and geometric corrections" Biosystems Engineering, Academic Press, UK, vol. 112, No. 2, Apr. 19, 2012, pp. 93-107.
(Continued)

*Primary Examiner* — Tsung-Yin Tsai
(74) *Attorney, Agent, or Firm* — Nixon & Vanderhye, P.C.

(57) ABSTRACT

An image processing device includes an acquisitor and a processor. The acquisitor acquires information including a first image of an object and a first relationship. The first image includes first and second image areas. The first image area corresponds to a first position of a first part of the object and has a first pixel value. The second image area corresponds to a second position of a second part of the object and has a second pixel value. The processor performs generating a first generated image including a third and a fourth image areas corresponding to the first and the second positions, determining a third pixel value of the third image area and a fourth pixel value of the fourth image area, and calculating a first distance corresponding to a length of the third image area and a second distance corresponding to a length of the fourth image area.

12 Claims, 10 Drawing Sheets

(51) Int. Cl.
*G06K 9/78* (2006.01)
*G06T 3/00* (2006.01)

(56) References Cited

U.S. PATENT DOCUMENTS

| | | | | |
|---|---|---|---|---|
| 2012/0287298 | A1* | 11/2012 | Kitashou | H04N 9/3185 |
| | | | | 348/222.1 |
| 2013/0155061 | A1* | 6/2013 | Jahanshahi | G06T 15/00 |
| | | | | 345/419 |
| 2013/0163820 | A1* | 6/2013 | Shimomura | G06K 9/00791 |
| | | | | 382/104 |
| 2013/0169794 | A1* | 7/2013 | Shimomura | E01C 23/01 |
| | | | | 348/128 |
| 2013/0170701 | A1* | 7/2013 | Suzuki | G06T 7/00 |
| | | | | 382/103 |
| 2013/0173208 | A1* | 7/2013 | Kuzunishi | E01C 23/01 |
| | | | | 702/141 |
| 2013/0279743 | A1* | 10/2013 | Li | B61L 23/042 |
| | | | | 382/103 |
| 2014/0132759 | A1* | 5/2014 | Itoh | G01C 15/00 |
| | | | | 348/135 |
| 2015/0269451 | A1* | 9/2015 | Seki | G06K 9/00805 |
| | | | | 382/104 |
| 2016/0342848 | A1* | 11/2016 | Seki | G01M 5/0033 |

FOREIGN PATENT DOCUMENTS

| | | |
|---|---|---|
| JP | 2003-232624 | 8/2003 |
| JP | 5322789 | 7/2013 |
| WO | 2009/064172 | 5/2009 |

OTHER PUBLICATIONS

Zhou, S. et al., "Remote Sensing Image Compression: A Review." 2015 IEEE International Conference on Multimedia Big Data, Apr. 1, 2015, pp. 406-410.

* cited by examiner

IMAGE PROCESSING DEVICE, INSPECTION DEVICE, IMAGE PROCESSING METHOD, AND NON-TRANSITORY RECORDING MEDIUM

CROSS-REFERENCE TO RELATED APPLICATIONS

This application is based upon and claims the benefit of priority from Japanese Patent Application No. 2014-223225, filed on Oct. 31, 2014; the entire contents of which are incorporated herein by reference.

FIELD

Embodiments described herein relate generally to an image processing device, an inspection device, an image processing method, and a non-transitory recording medium.

BACKGROUND

There exists an image (hereinafter referred to as an ortho-image) obtained by virtually observing a specific structure such as a road surface, a wall surface, or an inside wall of a tunnel from a vertical direction. The ortho-image is generated from a taken image. The taken image is taken by an imaging device such as a camera mounted to a moving object such as a vehicle or a robot. The ortho-image is, for example, an image obtained by looking down the object from the heights, and can therefore be used for recognition of a pattern on the road surface such as a stop line or a character. In an image processing device for processing such an ortho-image, it is desired to accurately perform, for example, crack inspection on the road surface.

DETAILED DESCRIPTION

Figure 1:
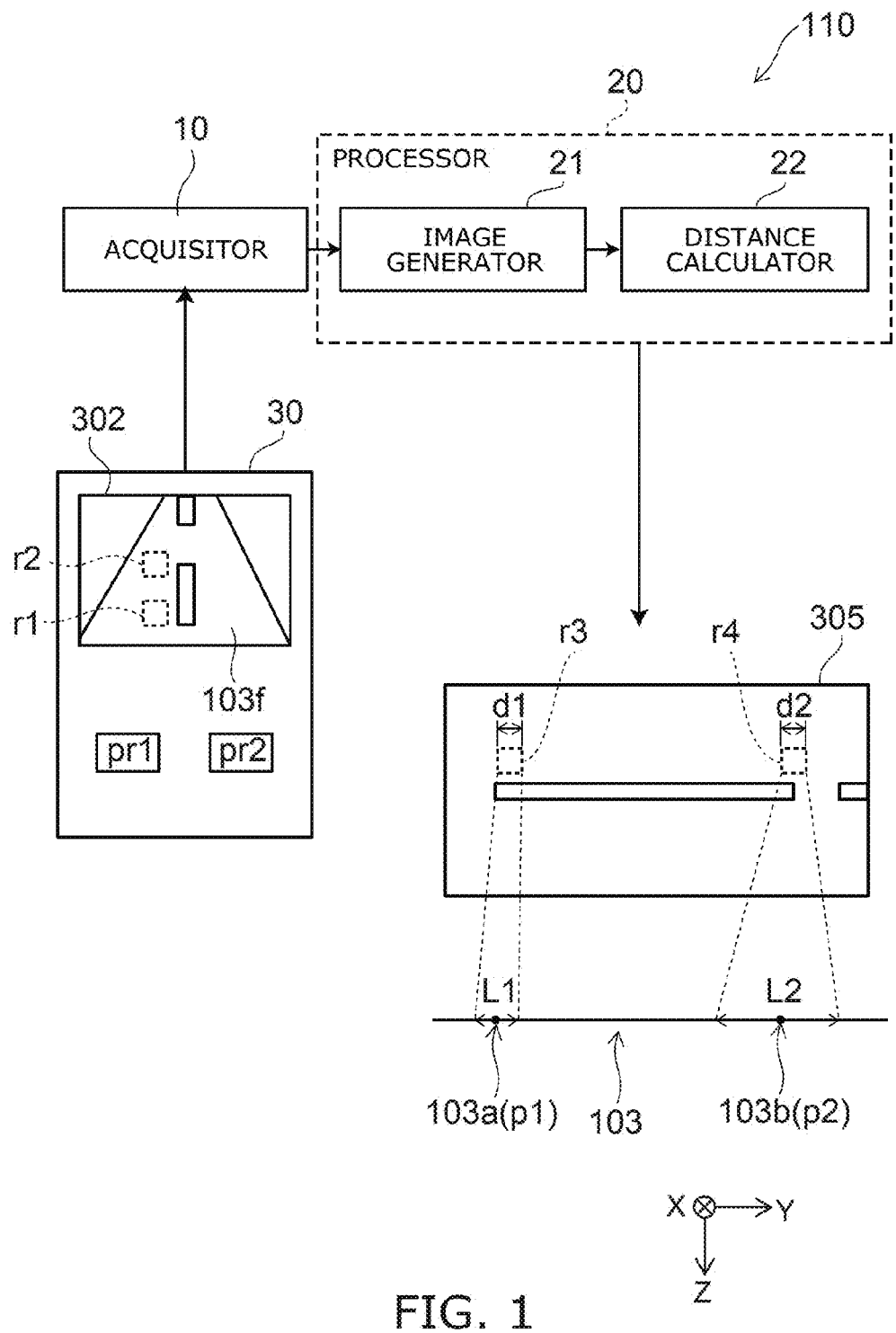
FIG. 1 is a block diagram illustrating an image processing device according to a first embodiment.

According to one embodiment, an image processing device includes an acquisitor and a processor. The acquisitor acquires information. The information includes a first taken image including a first image of an object disposed in a real space and a first relationship. The first image includes a first image area and a second image area. The first image area corresponds to a first position of a first part of the object and has a first pixel value. The second image area corresponds to a second position of a second part of the object and has a second pixel value. The first relationship is a relationship between a position of the first image area and the first position. The processor performs a first image generation processing to generate a first generated image including a third image area corresponding to the first position and a fourth image area corresponding to the second position, and projecting the object on a first plane, to determine a third pixel value of the third image area based on the information and the first pixel value, and to determine a fourth pixel value of the fourth image area based on the information and the second pixel value. The processor performs a first distance calculation processing to calculate a first distance in the real space corresponding to a length of the third image area in a first direction and a second distance in the real space corresponding to a length of the fourth image area in the first direction. The length of the third image area in the first direction is equal to the length of the fourth image area in the first direction. The first distance is different from the second distance.

According to another embodiment, an inspection device includes an acquisitor and a processor. The acquisitor acquires information. The information includes a first taken image including a first image of an object disposed in a real space and a first relationship. The first image includes a first image area and a second image area. The first image area corresponds to a first position of a first part of the object and has a first pixel value. The second image area corresponds to a second position of a second part of the object and has a second pixel value. The first relationship is a relationship between a position of the first image area and the first position. The processor performs a first image generation processing to generate a first generated image including a third image area corresponding to the first position and a fourth image area corresponding to the second position, and projecting the object on a first plane, to determine a third pixel value of the third image area based on the information and the first pixel value, and to determine a fourth pixel value of the fourth image area based on the information and the second pixel value. The processor performs a first distance calculation processing to calculate a first distance in the real space corresponding to a length of the third image area in a first direction and a second distance in the real space corresponding to a length of the fourth image area in the first direction. The length of the third image area in the first direction is equal to the length of the fourth image area in the first direction. The first distance is different from the second distance. The processor performs an inspection processing to inspect abnormity of the first part of the object when the first distance is one of equal to and shorter than a predetermined value.

According to another embodiment, an image processing method includes acquiring information. The information includes a first taken image including a first image of an object disposed in a real space and a first relationship. The first image includes a first image area and a second image area. The first image area corresponds to a first position of a first part of the object and has a first pixel value. The second image area corresponds to a second position of a second part of the object and has a second pixel value. The first relationship is a relationship between a position of the first image area and the first position. The method includes generating a first generated image including a third image area corresponding to the first position and a fourth image area corresponding to the second position, and projecting the object on a first plane, determining a third pixel value of the third image area based on the information and the first pixel value, and determining a fourth pixel value of the fourth image area based on the information and the second pixel value. The method includes calculating a first distance in the real space corresponding to a length of the third image area in a first direction and a second distance in the real space corresponding to a length of the fourth image area in the first direction. The length of the third image area in the first direction is equal to the length of the fourth image area in the first direction. The first distance is different from the second distance.

According to another embodiment, a non-transitory recording medium records an image processing program. The program causes a computer to perform acquiring information. The information includes a first taken image including a first image of an object disposed in a real space and a first relationship. The first image includes a first image area and a second image area. The first image area corresponds to a first position of a first part of the object and has a first pixel value. The second image area corresponds to a second position of a second part of the object and has a second pixel value. The first relationship is a relationship between a position of the first image area and the first position. The program causes the computer to perform generating a first generated image including a third image area corresponding to the first position and a fourth image area corresponding to the second position, and projecting the object on a first plane, determining a third pixel value of the third image area based on the information and the first pixel value, and determining a fourth pixel value of the fourth image area based on the information and the second pixel value. The program causes the computer to perform calculating a first distance in the real space corresponding to a length of the third image area in a first direction and a second distance in the real space corresponding to a length of the fourth image area in the first direction. The length of the third image area in the first direction is equal to the length of the fourth image area in the first direction. The first distance is different from the second distance.

Various embodiments of the invention will be described hereinafter with reference to the accompanying drawings.

It should be noted that the drawings are schematic or conceptual ones, and the relationship between the thickness and the width of each constituent, the dimensional ratio between the constituents, and so on are not necessarily the same as real ones. Further, even in the case of showing the same constituents, the dimensions and the ratio between the constituents are differently shown by drawing in some cases.

It should be noted that in the specification and the drawings of the patent application, substantially the same constituents as those having already been described with respect to drawings having already been mentioned will be denoted with the same reference symbols, and the detailed description thereof will arbitrarily be omitted.

First Embodiment

FIG. 1 is a block diagram illustrating an image processing device according to a first embodiment.

An image processing device 110 according to the embodiment includes an acquisitor 10 and a processor 20. As the acquisitor 10, there is used, for example, an input/output terminal. The acquisitor 10 includes an input/output interface for communicating with the outside with wire or wirelessly. As the processor 20, there is used an arithmetic device including, for example, a central processing unit (CPU) and a memory. As a part or the whole of each of the blocks of the processor 20, there can be used an integrated circuit such as an LSI (large scale integration) or an IC (integrated circuit) chip set. It is also possible to use an individual circuit as each of the blocks, or to use a circuit partially or wholly integrated. It is also possible to provide the blocks integrated with each other as a unit, or to provide some of the blocks separately. Further, in each of the blocks, a part of the block can be provided separately. As measures of integration, dedicated circuits or general-purpose processors can also be used besides LSI.

The processor 20 is provided with an image generator 21 and a distance calculator 22. These sections are each realized as, for example, an image processing program. In other words, the image processing device 110 is also realized using a general-purpose computer device as basic hardware. The function of each of the sections included in the image processing device 110 can be realized by making a processor installed in the computer device described above execute the image processing program. On this occasion, it is also possible to realize the image processing device 110 by installing the image processing program described above in the computer device in advance, or by arbitrarily installing the image processing program in the computer device after storing the image processing program described above in a storage medium such as a CD-ROM or distributing the grogram via a network. Further, the processor 20 can be realized arbitrarily using a memory or a hard disk incorporated in or externally attached to the computer device described above, a storage medium such as CD-R, CD-RW, DVD-RAM, or DVD-R, and so on.

Figure 2:
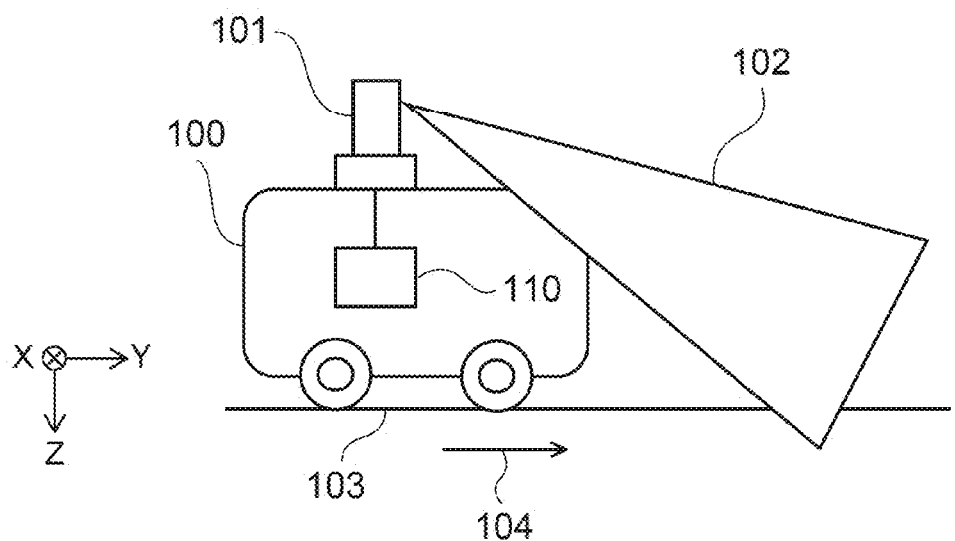
FIG. 2 is a schematic diagram illustrating a moving object, an imager, an object, and the image processing device.

FIG. 2 is a schematic diagram illustrating a moving object, an imager, an object, and the image processing device.

As the moving object 100, all of the moving objects such as vehicles, robots, and airplanes can be cited as the subject. One or more imagers 101 are installed in the moving object 100. The imager 101 observes a region 102 as an imaging range. The region 102 includes an object 103, and in the example, the object 103 is a road surface. The object 103 can also be other than the road surface. The object 103 can also be a structure formed of a roughly planar or circular cylindrical shape, or a rectangular cylindrical shape such as a wall surface, a floor surface, or a ceiling surface of a building, a sidewall of a road, an inner wall of a tunnel, a side surface or a lower surface of a bridge, and further, a wall surface, a ceiling surface, or a floor surface of a hoistway of an elevator.

In this example, the moving object 100 moves above the object 103 in a direction of movement 104. Therefore, the imager 101 takes an image of the object 103 from obliquely above. It should be noted that it is assumed that a direction parallel to the direction of movement 104 of the moving object 100 is a Y-axis direction, a direction perpendicular to the Y-axis direction is a Z-axis direction, and a direction perpendicular to both of the Y-axis direction and the Z-axis direction is an X-axis direction. The Z-axis direction is parallel to the height direction of the moving object 100. The X-axis direction is parallel to the depth (width) direction of the moving object 100.

The image processing device 110 is installed in, for example, the moving object 100 together with the imager 101. The image processing device 110 can also be provided in a place separated from the moving object 100. In other words, it is sufficient for the image processing device 110 to be connected to the imager 101 so as to be able to communicate with the imager 101 regardless of the installation site.

As shown in FIG. 1, the acquisitor 10 obtains information 30. The information 30 includes a first taken image 302, a first relationship pr1, and a second relationship pr2. It should be noted that it is sufficient for the information 30 to include at least the first relationship pr1. It is not required for the information 30 to include the second relationship pr2. The first taken image 302 includes a first image (hereinafter referred to as an object image 103f) of the object 103 provided in the real space. As the first taken image 302, there is used, for example, an image obtained by imaging the specific object 103 such as a road surface from obliquely above. The first taken image 302 includes a first image area r1 and a second image area r2. The first image area r1 corresponds to a first position p1 of a first part 103a of the object 103, and has a first pixel value. The second image area r2 corresponds to a second position p2 of a second part 103b of the object 103, and has a second pixel value. The first image area r1 is, for example, an area of one of the pixels of the first taken image 302. The second image area r2 is, for example, an area of another of the pixels of the first taken image 302.

The first relationship pr1 is information related to the relationship between the position of the first image area r1 and the first position p1. The first relationship pr1 includes imaging parameters including a focal distance of the imager 101 and an image center position of the imager 101. The first position p1 is a position obtained by performing the coordinate conversion on the position of the first image area r1 based on the imaging parameters. The first relationship pr1 is, for example, coordinate position information of the first position p1.

The second relationship pr2 is information related to the relationship between the position of the second image area r2 and the second position p2. The second relationship pr2 includes imaging parameters including the focal distance of the imager 101 and the image center position of the imager 101. The second position p2 is a position obtained by performing the coordinate conversion on the position of the second image area r2 based on the imaging parameters. The second relationship pr2 is, for example, coordinate position information of the second position p2. The second relationship pr2 can be calculated if the first relationship pr1 can be obtained. Therefore, it is not required for the second relationship pr2 to be obtained as the information.

The image generator 21 performs a first image generation process. In the first image generation process, there is generated a first generated image 305, which is an image of the object 103 projected on a first plane (e.g., an X-Y plane). The X-Y plane is parallel to a direction (here, the Y-axis direction) connecting the first part 103a and the second part 103b to each other. The first generated image 305 includes a third image area r3 corresponding to the first position p1, and a fourth image area r4 corresponding to the second position p2. In this example, the first generated image 305 is an ortho-image obtained by looking down at the object 103. In the first image generation process, a third pixel value of the third image area r3 is determined based on the information 30 (the first relationship pr1) and the first pixel value of the first image area r1, and a fourth pixel value of the fourth image area r4 is determined based on the information 30 (the second relationship pr2) and the second pixel value of the second image area r2. The third image area r3 is, for example, an area of one of the pixels of the first generated image 305. The fourth image area r4 is, for example, an area of another of the pixels of the first generated image 305.

The distance calculator 22 performs a first distance calculation process. In the first distance calculation process, there are calculated a first distance L1 in the real space corresponding to a length d1 of the third image area r3 in a first direction (here, the Y-axis direction), and a second distance L2 in the real space corresponding to a length d2 of the fourth image area r4 in the Y-axis direction. The length d1 is equal to the length d2, and the first distance L1 is different from the second distance L2. The fact that the first distance L1 and the second distance L2 are different from each other means the fact that a spatial resolution of the third image area r3 and a spatial resolution of the fourth image area r4 are different from each other.

In this example, the first taken image 302 is an image obtained by imaging the object 103 from obliquely above. Further, the first generated image 305 obtained by looking down at the object 103 is generated from the first taken image 302. Therefore, the first generated image 305 becomes an image in which the further the image area is located from the imager 101, the more blurred image is obtained. In other words, the first generated image 305 is high in spatial resolution in the image area near to the imager 101, and is low in spatial resolution in the image area far from the imager 101. It should be noted that the spatial resolution is represented by a distance with which two bodies (points) can be distinguished from each other. The shorter the distance is, the higher the spatial resolution becomes.

As the generation method of the ortho-image, there can be cited a reference example of sectioning the road surface into voxels each having a predetermined size, and then polling the vote of each of the points obtained from the input image to the voxels thus sectioned. According to this reference example, a low-density spot is determined based on the number of votes to the voxel. In the reference example, the low-density spot low in resolution is distinguished. However, it has been unachievable to find out the distance (i.e., the spatial resolution) corresponding to the real space in each position on the ortho-image. Therefore, it has been difficult to identify a crack having a predetermined size in a crack inspection of, for example, a road surface and concrete.

In contrast, according to the embodiment, it is possible to calculate the distance (the spatial resolution) in the real space at each position of the ortho-image. Therefore, it becomes possible to perform the crack detection and so on narrowing down to the image area having the necessary spatial resolution. Therefore, the crack detection high in accuracy and so on becomes possible. Thus, the image processing device high in accuracy can be provided.

Figure 3:
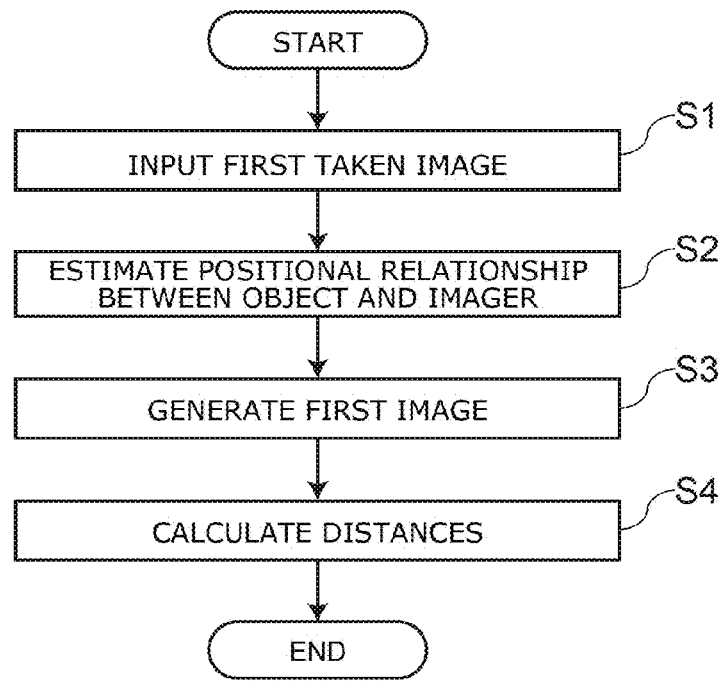
FIG. 3 is a flowchart illustrating an image processing method according to the first embodiment.

FIG. 3 is a flowchart illustrating an image processing method according to the first embodiment.

The acquisitor 10 obtains (step S1) the first taken image 302 taken by the imager 101 installed in the moving object 100.

In the imager 101, the focal distance of the imager 101 and the image center position of the imager 101 are known in advance as the imaging parameters (internal parameters) of the imager 101. The imaging parameters are formed of a matrix A expressed by Formula 1. It should be noted that the focal distance denotes a distance between the lens and an imaging element (an image plane). The image center position denotes a coordinate of an intersection between the optical axis and the imaging element (the image plane).

Formula 1

$$\tilde{x} \sim P\tilde{X} = A \begin{pmatrix} 1 & 0 & 0 & 0 \\ 0 & 1 & 0 & 0 \\ 0 & 0 & 1 & 0 \end{pmatrix} \tilde{X}, \quad (1)$$

$$A = \begin{pmatrix} fx & 0 & cx \\ 0 & fy & cy \\ 0 & 0 & 1 \end{pmatrix}$$

Hereinafter, the symbol ~ disposed above x or X is referred to as tilde, and represents that x or X is a homogenous coordinate. The formula x (tilde)=(u, v, 1) is a homogenous coordinate expression of a two-dimensional position on the image. The formula X (tilde)=(X, Y, Z, 1) is a homogenous coordinate expression of a three-dimensional position of a certain point in a space. The values fx and fy are obtained by dividing the respective focal distances of the image in horizontal and vertical directions by an effective pixel distance of the image. The values cx and cy represent the image center position of the imager. The symbol P represents a perspective projection matrix.

In the case in which a distortion exists in the lens of the imager 101, it is preferable to obtain the distortion. As the distortion, it is desirable to consider, for example, a tangential distortion, a radial distortion, and a distortion of a fisheye lens, an omnidirectional lens, or the like.

The acquisitor 10 obtains (step S2), for example, the first relationship pr1 and the second relationship pr2. The steps S1 and S2 can simultaneously be performed. Each of the first relationship pr1 and the second relationship pr2 can be obtained by estimating the positional relationship between the imager 101 and the object 103. The estimation of the positional relationship is calculated in the outside of the image processor 110, and as a result of the calculation, the information related to the first relationship pr1 and the second relationship pr2 is input. It should be noted that it is also possible for the processor 20 to perform the estimation of the positional relationship.

Figure 4:
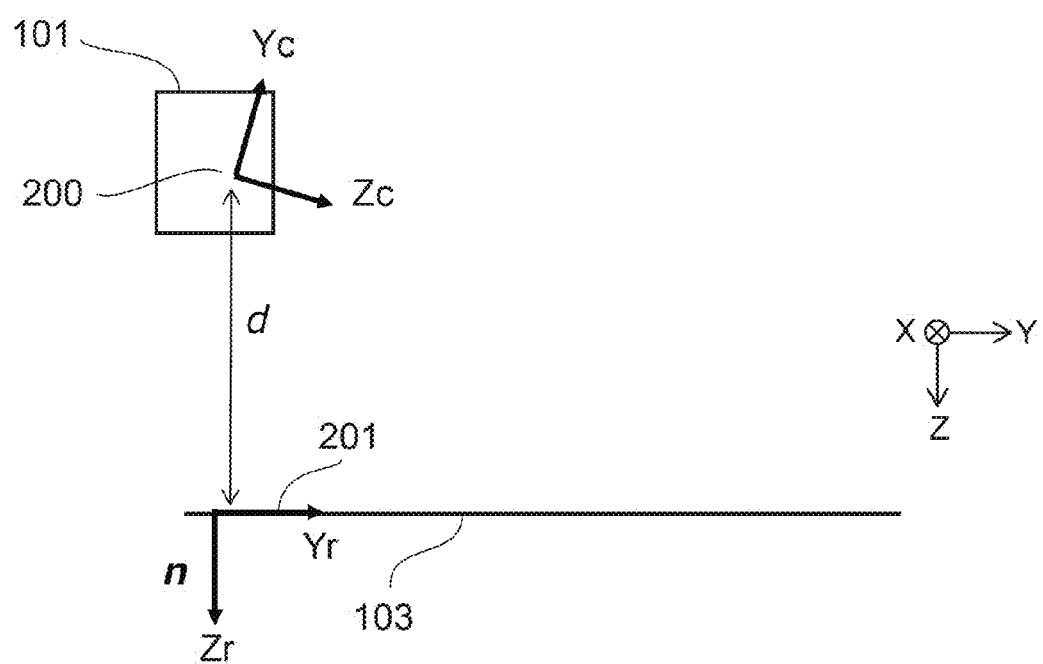
FIG. 4 is a schematic diagram illustrating the positional relationship between the imager and the object.

FIG. 4 is a schematic diagram illustrating the positional relationship between the imager and the object.

The positional relationship mentioned here means a relative positional relationship between a camera coordinate system 200 (Xc is omitted in FIG. 4 for the sake of simplification) of the imager 101 and an object coordinate system 201 (Xr is omitted in FIG. 4 for the sake of simplification) of the object 103 as shown in FIG. 4. Specifically, the positional relationship is formed of a 3×3 rotation matrix R and a three-dimensional translation vector t. Here, the normal vector of the object 103 is expressed as n=(nx, ny, nz). The length of the vector connecting the camera coordinate system 200 and the object coordinate system 201 to each other is represented by d. The coordinate conversion between the camera coordinate system 200 of the imager 101 and the object coordinate system 201 of the object 103 can be performed using Formula 2.

Formula 2

$$X_{201} = R^{-1} X_{200} + t \quad (2)$$

$$R = \begin{pmatrix} \cos\theta\cos\phi\cos\psi - \sin\phi\sin\psi & \cos\theta\sin\phi\cos\psi + \cos\phi\sin\psi & -\sin\theta\cos\psi \\ -\cos\theta\cos\phi\sin\psi - \sin\phi\cos\psi & -\cos\theta\sin\phi\sin\psi + \cos\phi\cos\psi & \sin\theta\sin\psi \\ \sin\theta\cos\psi & \sin\theta\sin\phi & \cos\theta \end{pmatrix}$$

$$\theta = \arccos(nz),$$
$$\Psi = \arctan(-ny/nx),$$
$$\Phi = \pm\pi/2$$
$$t = (0 \ 0 \ d)$$

An arbitrary two-dimensional position of the object 103 in the first taken image 302 is converted into a three-dimensional position (the camera coordinate system 200) of the imager 101 using Formula 1. Further, the three-dimensional position of the imager 101 is converted into a three-dimensional position (the object coordinate system 201) of the object 103 using Formula 2. Thus, the position of the first image area r1 of the object 103 in the first taken image 302 can be converted into the first position p1 in the object 103 in the real space. Similarly, the position of the second image area r2 of the object 103 in the first taken image 302 can be converted into the second position p2 in the object 103 in the real space.

Then, a specific method of obtaining the positional relationship between the imager 101 and the object 103 will be described.

In a rough classification, there can be cited the case (1) in which the positional relationship between the moving object 100 and the object 103 does not change, and the case (2) in which the positional relationship between the moving object 100 and the object 103 dynamically changes. The case (1) in which the positional relationship does not change corresponds to, for example, the case in which the moving object 100 smoothly moves along the object 103. This case corresponds to the case in which the moving object 100 makes a movement at low speed, the case in which the moving object makes a movement along a rail. In contrast, the case (2) in which the positional relationship changes dynamically corresponds to, for example, the case in which there is made a relatively significant movement such as pitching or rolling due to the undulation of the road surface or the movement of a vehicle as in the case of a car.

(1) In the case of fixing the positional relationship between the imager 101 (the camera coordinate system 200) and the object 103 (the object coordinate system 201), it is also possible to use a value, which is obtained by calculating the positional relationship between the imager 101 and the moving object 100 from design data such as drawings, as the estimation method of the positional relationship. Further, it is also possible to dispose a calibration plate used for calibration on the road surface, and then estimate the positional relationship between the calibration plate and the camera by performing a calibration operation.

(2) In the case of dynamically calculating the positional relationship between the imager 101 (the camera coordinate system 200) and the object 103 (the object coordinate system 201), there are several methods as described below.

(2-1) As a method of using two cameras, in the case in which the object is constituted by planes on the space such as the road surface, the positions $x_1$, $x_2$ on the images, at which a body located in a plane on the space is projected on the two respective cameras, can be expressed by a 3×3 projective transformation matrix H as shown in Formula 3.

Formula 3

$$\tilde{x}_1 \sim H\tilde{x}_2 \quad (3)$$

It should be noted that the symbol ~ (tilde) disposed above $x_1$ and $x_2$ represents a homogenous coordinate. The projective transformation matrix H includes the normal vector n of a plane on the space and the distance d to the plane, and can be calculated using singular value decomposition in the case in which the imaging parameters of the camera are known. As the calculation method of the projective transformation matrix H, characteristic points are extracted on the images of the respective cameras to obtain the corresponding positions between the characteristic points. The projective transformation matrix H can also be obtained using a least-square method based on the corresponding positions, or can also be obtained while removing outliers using an M-estimation method, a random sample consensus (RANSAC) method, or the like.

(2-2) As a method of using a single camera, if the images taken at respective time points different from each other are used, the positional relationship between the road surface and the camera can be estimated similarly to the method of using two cameras.

(2-3) As a method of using no image, it is also possible to detect a change in a sensor value using an acceleration sensor or an angular velocity sensor. Thus, it is possible to obtain the positional relationship between the road surface and the camera at each of the time points.

Further, it is also possible to obtain the positional relationship between the road surface and the camera by obtaining the three-dimensional shape of the road surface using a distance measuring device using a laser or the like, and then applying a specific road surface to the three-dimensional shape.

The image generator 21 generates (step S3) the first generated image 305 using the first taken image 302 obtained in the step S1 and the first relationship pr1 and the second relationship pr2 obtained in the step S2. The first relationship pr1 includes the first position p1, and the second relationship pr2 includes the second position p2. As the first generated image 305, for example, an ortho-image obtained by orthographically projecting the object 103 is generated.

Figure 5A:
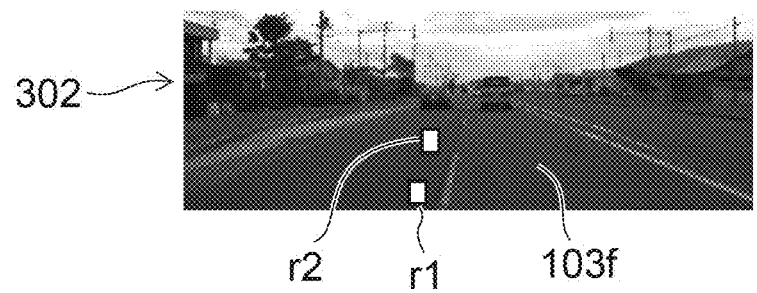
FIG. 5A and FIG. 5B are diagrams respectively illustrating the first taken image and the first generated image as an example.
Figure 5B:
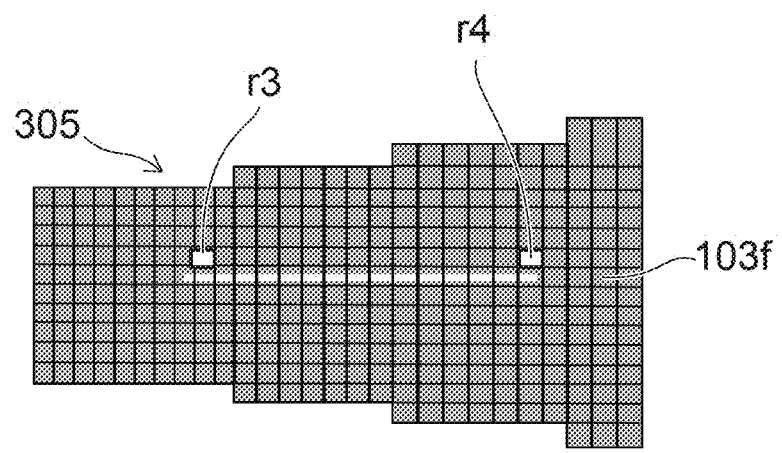

FIG. 5A and FIG. 5B are diagrams respectively illustrating the first taken image and the first generated image as an example.

FIG. 5A is a diagram illustrating the first taken image 302 taken by the imager 101.

FIG. 5B is a diagram illustrating the first generated image 305 generated by the image generator 21.

As shown in FIG. 5A, the first taken image 302 includes the object image 103f. In this example, the object image 103f is an image of a road surface. The first taken image 302 includes the first image area r1 and the second image area r2. The first image area r1 is, for example, an area of one of the pixels of the first taken image 302. The second image area r2 is, for example, an area of another of the pixels of the first taken image 302.

As shown in FIG. 5B, the first generated image 305 is generated from the first taken image 302. In this example, the first generated image 305 is an ortho-image obtained by orthographically projecting the object 103. The first generated image 305 includes the third image area r3 and the fourth image area r4. The third image area r3 is, for example, an area of one of the pixels of the first generated image 305. The fourth image area r4 is, for example, an area of another of the pixels of the first generated image 305.

Figure 6:
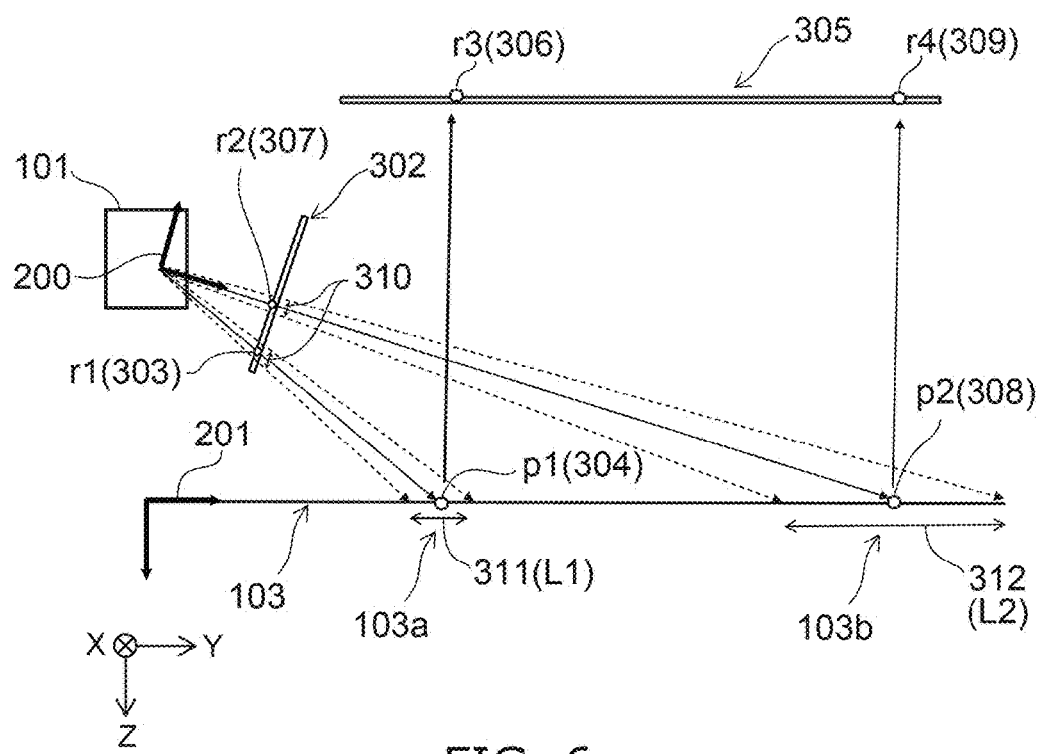
FIG. 6 is a schematic diagram illustrating a first taken image, an object, and a first generated image.

FIG. 6 is a schematic diagram illustrating a relationship between the first taken image, the object, and the first generated image.

The first taken image 302 includes the first image area r1 and the second image area r2. The first image area r1 is an area of the pixel disposed at a position 303 in the first taken image 302. The second image area r2 is an area of the pixel disposed at a position 307 in the first taken image 302.

In this example, the position 303 in the first taken image 302 corresponds to a position 304 in the object 103. The position 304 in the object 103 can be converted into a position 306 in the first generated image 305 obtained by orthographically projecting the object 103. Further, the position 307 in the first taken image 302 corresponds to a position 308 in the object 103. The position 308 in the object 103 can be converted into a position 309 in the first generated image 305 obtained by orthographically projecting the object 103.

The relationship between the three-dimensional position on the object 103 and the two-dimensional position on the taken image 302 can be expressed using Formula 4 below.

Formula 4

$$\tilde{x}_{302} \sim A(I|0)\tilde{X}_{200} = A(R|-Rt)\tilde{x}_{201} \quad (4)$$

By using Formula 4, the position on the first taken image 302 corresponding to an arbitrary position on the object 103 is obtained. In this example, the position 304 of the first part 103a of the object 103 corresponds to the position 303 of the first image area r1 of the first taken image 302. The position 308 of the second part 103b of the object 103 corresponds to the position 307 of the second image area r2 of the first taken image 302. The position 304, namely the first position p1, is obtained from the information 30 related to the first relationship pr1. The position 308, namely the second position p2, is obtained from the information 30 related to the second relationship pr2. Therefore, if the information 30 including the first relationship pr1 (or the first relationship pr1 and the second relationship p2) can be obtained, the position on the first taken image 302 can be identified using Formula 4.

In the case in which the object 103 is a plane on the space, it is possible to perform the transformation using the projective transformation matrix between the two images as described with respect to Formula 3 described above. In other words, a projective transformation matrix Ho corresponding to the object 103 exists between the first generated image 305 and the first taken image 302. For example, by using the projective transformation matrix Ho of Formula 5 below, the correspondence relationship between the first generated image 305 and the first taken image 302 can easily be calculated. Thus, the generation of the ortho-image can easily be performed.

Formula 5

$$\tilde{x}_{305} \sim H_o \tilde{x}_{302} R^{-1} A^{-1} \tilde{x}_{305} \quad (5)$$

The projective transformation matrix Ho is constituted by imaging parameters (the internal parameters) $A_{305}$ necessary for generating the first generated image 305, the rotation matrix R between the camera coordinate system 200 and the object coordinate system 201, and the imaging parameters A of the imager 101. Here, regarding the imaging parameters $A_{305}$, arbitrary parameters can be set. For example, in the case in which the distance from the imager 101 to the object 103 is represented by d (see FIG. 4), the imaging parameters $A_{305}$ can be determined as Formula 6 below.

Formula 6

$$A_{305} = \begin{pmatrix} \alpha d & 0 & cx' \\ 0 & \alpha d & cy' \\ 0 & 0 & 1 \end{pmatrix} \quad (6)$$

Here, a is an arbitrary parameter, and the transformation is performed so that the distance of 1 meter (m) on the actual road surface corresponds to the size of a pixels on the first generated image 305. In other words, each of the pixels of the first generated image 305 corresponds to the size of 1/a (m) in the distance on the actual road surface. Parameters cx' and cy' correspond to the image center of the camera for generating the first generated image 305.

The image generator 21 sets a reference distance corresponding to a plurality of image areas of the first generated image 305 in order to generate the first generated image 305. In this example, $1/\alpha$ (m) is set as the reference distance. Thus, the imaging parameters $A_{305}$ shown in Formula 6 are determined.

The image generator 21 assigns the first pixel value of the first image area r1 to the position 306 of the third image area r3 of the first generated image 305 corresponding to the first position p1, and assigns the second pixel value of the second image area r2 to the position 309 of the fourth image area r4 of the first generated image 305 corresponding to the second position p2 using Formulas 4 through 6. Therefore, the pixel value at the position 304 of the first part 103a of the object 103 can be obtained from the position 303 of the first image area r1 of the first taken image 302. The pixel value thus obtained is mapped at the position 306 of the third image area r3 of the first generated image 305. Similarly, the pixel value at the position 308 of the second part 103b of the object 103 can be obtained from the position 307 of the second image area r2 of the first taken image 302. The pixel value thus obtained is mapped at the position 309 of the fourth image area r4 of the first generated image 305. By repeating this process, the pixel values of the first generated image 305 can be obtained from the first taken image 302.

The distance calculator 22 calculates (step S4) the distance on the real space corresponding to each of the positions in the first generated image 305 generated in the step S3. The distance calculator 22 calculates the first distance L1 in the real space corresponding to the length d1 of the third image area r3 in the Y-axis direction, and the second distance L2 in the real space corresponding to the length d2 of the fourth image area r4 in the Y-axis direction. The length d1 is equal to the length d2, and the first distance L1 is different from the second distance L2. The fact that the first distance L1 and the second distance L2 are different from each other means the fact that a spatial resolution of the third image area r3 and a spatial resolution of the fourth image area r4 are different from each other.

Here, as shown in FIG. 2 described above, since the road surface is observed from the imager 101 (the camera) placed in an upper part of the moving object 100 (vehicle), the imager 101 is not placed so as to be correctly opposed to the object 103. In such a case, the longer the distance from the imager 101 is, the more blurred ortho-image is generated.

As shown in FIG. 6, the first position p1 (304) in the object 103 corresponds to the position 303 of the first image area r1 of the first taken image 302. The second position p2 (308) in the object 103 is further from the first position p1 (304) with reference to the imager 101. The second position p2 (308) corresponds to the position 307 of the second image area r2 of the first taken image 302. The position on the object 103 is obtained assuming that each of the first image area r1 and the second image area r2 has a size 310 corresponding to one pixel. At the first position p1 (304), there exists an extent 311 on the object 103. At the second position p2 (308), there exists an extent 312. The drawing shows that the extent 312 is larger than the extent 311. Therefore, in the first generated image 305, the further the area is located from the imager 101, the more blurred image is obtained.

The two-dimensional position on the first generated image 305 can be converted into the three-dimensional position in the object coordinate system 201 on the object 103 using Formula 7 below. Here, it is possible to assume that the three-dimensional position of the object 103 does not have height, namely the value in the Z-axis is 0. The two-dimensional position on the first generated image 305 and the three-dimensional position on the object 103 can uniquely be determined.

Formula 7

$$\tilde{x}_{305} \sim A_{305}(I|0)\tilde{x}_{201} \quad (7)$$

The three-dimensional position on the object 103 obtained in such a manner is converted into the position (u, v) in the first taken image 302 using Formula 4. With respect to the position (u, v) thus converted, for example, a shift amount $\delta$ is set to $\pm 0.5$ ($\pm$a half pixel). In this case, the positions in the real space of the object 103 at the positions shifted $\pm$a half pixel are calculated using Formula 8.

Formula 8

$$\tilde{x}'_{302} = \begin{pmatrix} u \\ v+\delta \\ 1 \end{pmatrix} \sim A(R|-Rt) \begin{pmatrix} X' \\ Y' \\ 0 \\ 1 \end{pmatrix} \quad (8)$$

$$\tilde{x}''_{302} = \begin{pmatrix} u \\ v-\delta \\ 1 \end{pmatrix} \sim A(R|-Rt) \begin{pmatrix} X'' \\ Y'' \\ 0 \\ 1 \end{pmatrix}$$

Further, an actual distance on the object 103 when shifted $\pm$a half pixel is obtained using Formula 9.

Formula 9

$$\text{diff} = \sqrt{(X'-X'')^2(Y'-Y'')^2} \quad (9)$$

A distance diff obtained in Formula 9 is a distance in the real space at a position $x_{305}$ on the first generated image 305. In this example, the distance diff corresponds to the distance on the real space assigned to one pixel, and represents the spatial resolution. In such a manner as described above, the distance calculator 22 calculates the first distance L1 in the real space corresponding to the length d1 of the third image area r3 in the Y-axis direction, and the second distance L2 in the real space corresponding to the length d2 of the fourth image area r4 in the Y-axis direction using Formulas 7 through 9.

It should be noted that although in this example, the calculation is performed with respect to the vertical direction (the Y-axis direction) of the first generated image 305, the calculation can also be performed with respect to the horizontal axis (the X-axis direction), and in the case in which a plurality of values exists, it is sufficient to set the maximum value to the distance diff. The first generated image 305 orthographically projects the object 103, and is generated at regular intervals. Therefore, the longer the distance is, the narrower the interval between the projection positions in the first taken image 302 becomes. Therefore, the pixel value in the first generated image 305 is obtained in a narrow range of the first taken image 302. Therefore, the image enlarged to be blurred is obtained. In this example, the second distance L2 of the fourth image area r4 is longer than the first distance L1 of the third image area r3. Therefore, a more blurred image is obtained in the fourth image area r4 than in the third image area r3.

It should be noted that although the shift amount δ is set to 0.5 (a half pixel) here, in the case in which information of a plurality of pixels is mixed with the taken image of the imager 101 due to compression or the like, the shift amount δ can also be set to be larger than 0.5. Further, in the case in which motion wobbling exists in the taken image of the imager 101 due to the motion of the moving object 100, it is also possible to adjust the shift amount δ in accordance with the amplitude of the wobbling. The amplitude of the wobbling can also be obtained by estimating, for example, a point spread function.

Further, in the case in which a body other than the object 103 shows up in the first generated image 305, it is also possible to, for example, assign a large value or a negative value to the distance diff so that the area other than the object 103 can be detected to be distinguished from the object area.

A distance map is generated based on the distance (the spatial resolution) calculated with respect to each of the pixel positions of the first generated image 305.

The distance diff obtained in Formula 9 is used as the distance in each of the pixel positions of the first generated image 305. In this example, the first distance L1 is determined with respect to the third image area r3, and the second distance L2 is determined with respect to the fourth image area r4. The same applies to other image areas of the first generated image 305.

Here, with respect to the distance diff obtained in Formula 9, the imaging parameters $A_{305}$, which are determined when generating the first generated image 305, can also be taken into consideration. The reference distance per pixel of the first generated image 305 is $1/\alpha$ according to Formula 6. The value $1/\alpha$ is unified in the scale of the same real space as that of the distance diff obtained by Formula 9. Therefore, it is sufficient to set larger one of the distance diff and the reference distance $1/\alpha$ to the distance at the corresponding pixel position. In this case, the distance calculator 22 selects larger one of the first distance L1 and the reference distance $1/\alpha$ in the third image area r3, and selects larger one of the second distance L2 and the reference distance $1/\alpha$ in the fourth image area r4.

Figure 7:
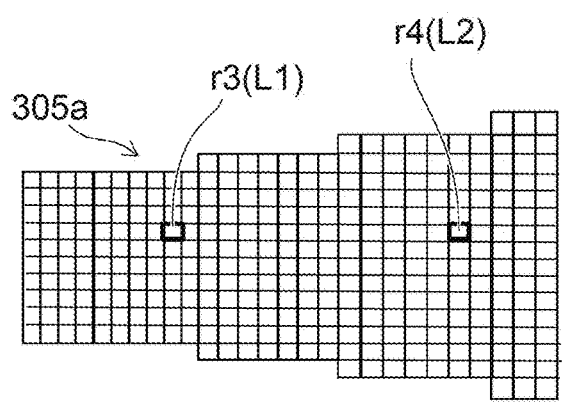
FIG. 7 is a diagram illustrating the distance map corresponding to the first generated image shown in FIG. 5B.

FIG. 7 is a diagram illustrating the distance map corresponding to the first generated image shown in FIG. 5B.

In the step S4, the distance map 305a corresponding to the first generated image 305 is generated. The first distance L1 corresponding to the third image area r3 of the first generated image 305 is stored at the corresponding position in the distance map 305a. The second distance L2 corresponding to the fourth image area r4 is stored at the corresponding position in the distance map 305a. Subsequently, in substantially the same manner, the distance on the real space calculated with respect to each of the plurality of image areas of the first generated image 305 is stored in the distance map 305a.

According to the embodiment, it is possible to calculate the distance (the spatial resolution) in the real space at each of the positions of the ortho-image. Therefore, it becomes possible to perform the crack detection and so on narrowing down to the image area having the necessary spatial resolution. Therefore, the crack detection high in accuracy and so on becomes possible. Thus, the image processing device high in accuracy can be provided.

It should be noted that the embodiment is not limited to the ortho-image obtained by looking down the object such as the road surface. The embodiment can also be applied to the ortho-image obtained by viewing the specific object laterally or in an oblique direction.

Second Embodiment

Figure 8:
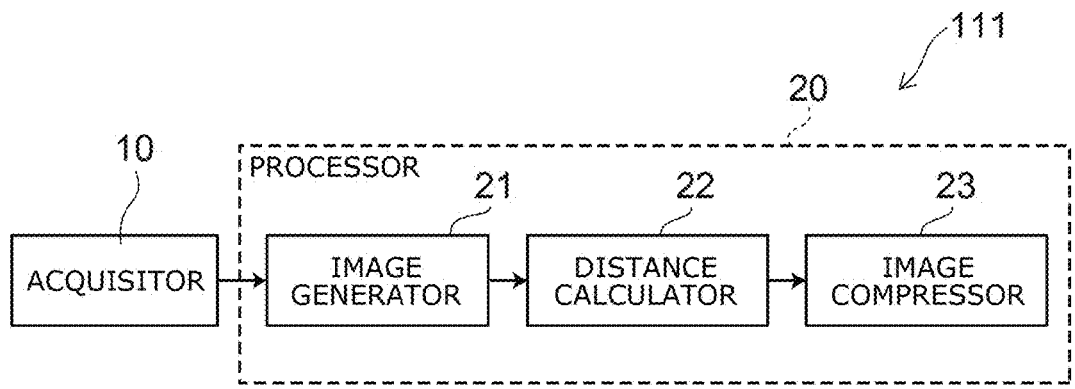
FIG. 8 is a block diagram illustrating an image processing device according to a second embodiment.

FIG. 8 is a block diagram illustrating an image processing device according to a second embodiment.

An image processing device 111 according to the embodiment includes the acquisitor 10 and the processor 20. The processor 20 includes the image generator 21, the distance calculator 22, and an image compressor 23.

The image compressor 23 performs an image compression process for compressing the first generated image 305. In the image compression process, in the case in which the first distance L1 is longer than the second distance L2, the image compressor 23 sets the compression ratio of the third image area r3 higher than the compression ratio of the fourth image area r4. Further, the image compressor 23 sets the compression ratio of the third image area r3 lower than the compression ratio of the fourth image area r4 in the case in which the first distance L1 is shorter than the second distance L2. Here, the compression ratio is a value showing the difference between the data amount of the image compressed and the data amount of the image not compressed, and the data amount of the image not compressed in ratio (percent). If the compression ratio is high, the data amount of the image decreases in comparison.

Figure 9:
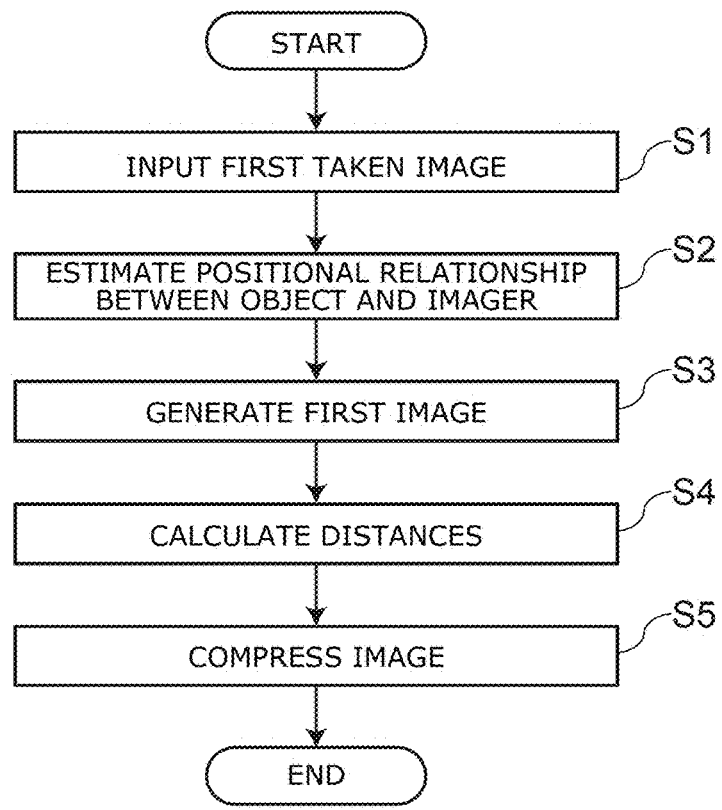
FIG. 9 is a flowchart illustrating an image processing method according to the second embodiment.

FIG. 9 is a flowchart illustrating an image processing method according to the second embodiment.

The steps S1 through S4 related to the embodiment are already explained in the description of the first embodiment, and therefore, the explanation here will be omitted. The first generated image 305 obtained in the step S3 and the distance map 305a obtained in the step S4 are used as the input of the image compressor 23.

The image compressor 23 performs (step S5) the compression of the first generated image 305 using the distance map 305a. In other words, in order to decrease the data size of the first generated image 305, the compression of the image is performed. On this occasion, control of the data amount is performed on each of the image areas of the first generated image 305 using the distance map 305a. In the first generated image 305, in the image area long in distance, blur occurs and a high-frequency component is not included. Therefore, it is sufficient to store only the data of the low-frequency component. In contrast, in the image area short in distance, since the high-frequency component through the low-frequency component are included, it is necessary to store the data of the high-frequency component through the low-frequency component. Therefore, it is preferable to set the compression ratio high in the image area long in distance, and to set the compression ratio low in the image area short in distance.

It should be noted that in the case in which it is difficult to perform the compression pixel by pixel, it is also possible to generate blocks each including a plurality of pixels in the distance map 305a. It is possible to calculate one distance in each of the blocks using the minimum value, the median value, and the average value of the distances in that block, and use the one distance for the calculation of the compression ratio in that block.

According to the embodiment, it is possible to make the compression ratio different between the image areas using the distance (the spatial resolution) in the real space at each of the positions of the ortho-image to thereby perform efficient image compression.

Third Embodiment

Figure 10:
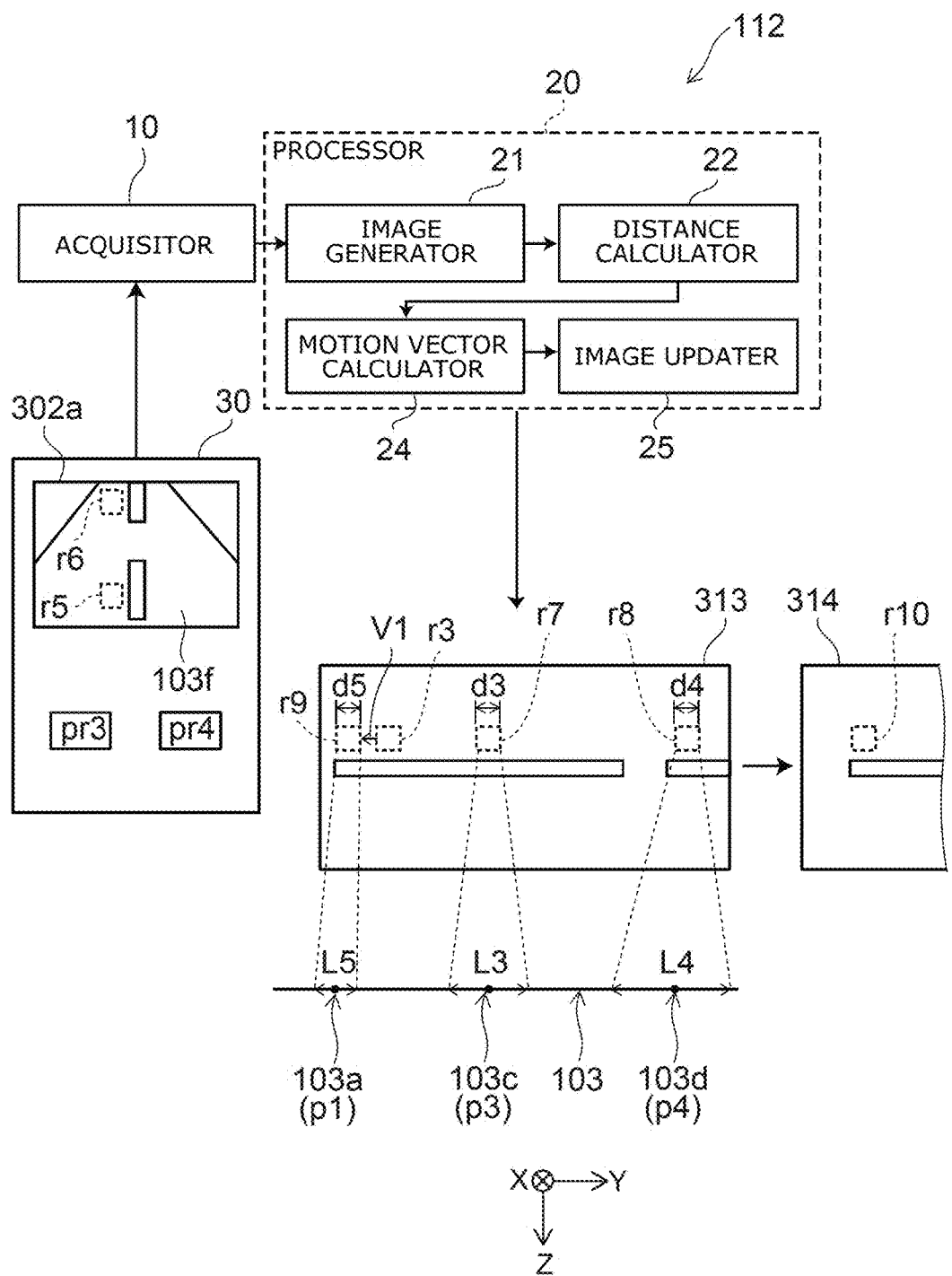
FIG. 10 is a block diagram illustrating an image processing device according to a third embodiment.

FIG. 10 is a block diagram illustrating an image processing device according to a third embodiment.

An image processing device 112 according to the embodiment includes the acquisitor 10 and the processor 20. The processor 20 includes the image generator 21 and the distance calculator 22, and further, a motion vector calculator 24, and an image updater 25.

The acquisitor 10 obtains the information 30. The information 30 includes the first taken image 302, the first relationship pr1, and the second relationship pr2, and further includes a second taken image 302a, a third relationship pr3, and a fourth relationship pr4. It should be noted that it is sufficient for the information 30 to include at least the first relationship pr1 and the third relationship pr3. The second relationship pr2 and the fourth relationship pr4 are not required to be obtained as the information. The second taken image 302a includes a second image (here, the object image 103f) of the object 103, and is different from the first taken image 302. The first taken image 302 and the second taken image 302a are different from each other in at least one of, for example, the direction, the position (place), and time of imaging. The second taken image 302a includes a fifth image area r5 and a sixth image area r6. The fifth image area r5 corresponds to a third position p3 of a third part 103c of the object 103, and has a fifth pixel value. The sixth image area r6 corresponds to a fourth position p4 of a fourth part 103d of the object 103, and has a sixth pixel value. The fifth image area r5 is, for example, an area of one of the pixels of the second taken image 302a. The sixth image area r6 is, for example, an area of another of the pixels of the second taken image 302a.

The third relationship pr3 is information related to the relationship between the position of the fifth image area r5 and the third position p3. The third relationship pr3 includes imaging parameters including the focal distance of the imager 101 and the image center position of the imager 101. The third position p3 is a position obtained by performing the coordinate conversion on the position of the fifth image area r5 based on the imaging parameters. The third relationship pr3 is, for example, the coordinate position information of the third position p3.

The fourth relationship pr4 is information related to the relationship between the position of the sixth image area r6 and the fourth position p4. The fourth relationship pr4 includes imaging parameters including the focal distance of the imager 101 and the image center position of the imager 101. The fourth position p4 is a position obtained by performing the coordinate conversion on the position of the sixth image area r6 based on the imaging parameters. The fourth relationship pr4 is, for example, the coordinate position information of the fourth position p4.

The image generator 21 performs a second image generation process. In the second image generation process, there is generated a second generated image 313, which is an image of the object 103 projected on a second plane (e.g., an X-Y plane). The X-Y plane is parallel to a direction (here, the Y-axis direction) connecting the third part 103c and the fourth part 103d to each other. The second generated image 313 includes a seventh image area r7 corresponding to the third position p3, and an eighth image area r8 corresponding to the fourth position p4. In the second image generation process, a seventh pixel value of the seventh image area r7 is determined based on the information 30 and the fifth pixel value of the fifth image area r5, and an eighth pixel value of the eighth image area r8 is determined based on the information 30 and the sixth pixel value of the sixth image area r6. The seventh image area r7 is, for example, an area of one of the pixels of the second generated image 313. The eighth image area r8 is, for example, an area of another of the pixels of the second generated image 313.

The distance calculator 22 performs a second distance calculation process. In the second distance calculation process, the distance calculator 22 calculates a third distance L3 in the real space corresponding to a length d3 of the seventh image area r7 in the Y-axis direction, and a fourth distance L4 in the real space corresponding to a length d4 of the eighth image area r8 in the Y-axis direction. The length d3 is equal to the length d4, and the third distance L3 is different from the fourth distance L4.

The motion vector calculator 24 performs a motion vector calculation process. In the motion vector calculation process, a ninth image area r9, which corresponds to the third image area r3 of the first generated image 305 and has a ninth pixel value, is detected in the second generated image 313. In this process, a template matching method (or a pattern matching method), for example, is used. In the motion vector calculation process, there is calculated a motion vector V1 including the difference between the position of the third image area r3 and the position of the ninth image area r9. Here, a length d5 of the ninth image area r9 in the Y-axis direction corresponds to a fifth distance L5 in the real space. It should be noted that the motion vector V1 can be calculated for each of the plurality of image areas (by pixel, or by block) corresponding to each other between the first generated image 305 and the second generated image 313. The ninth image area r9 is, for example, an area of one of the pixels included in the second generated image 313.

The image updater 25 performs a third image generation process. In the third image generation process, a third generated image 314, which is obtained by projecting the object 103 on the X-Z plane, is generated based on the first generated image 305, the second generated image 313, and the motion vector V1. The third generated image 314 includes a tenth image area r10 corresponding to the first position p1. In the third image generation process, in the case in which the first distance L1 is shorter than the fifth distance L5, a pixel value of the tenth image area r10 is set to the third pixel value of the third image area r3. In the case in which the first distance L1 is equal to or longer than the fifth distance L5, the pixel value of the tenth image area r10 is set to the ninth pixel value of the ninth image area r9. The tenth image area r10 is, for example, an area of one of the pixels included in the third generated image 314.

Figure 11:
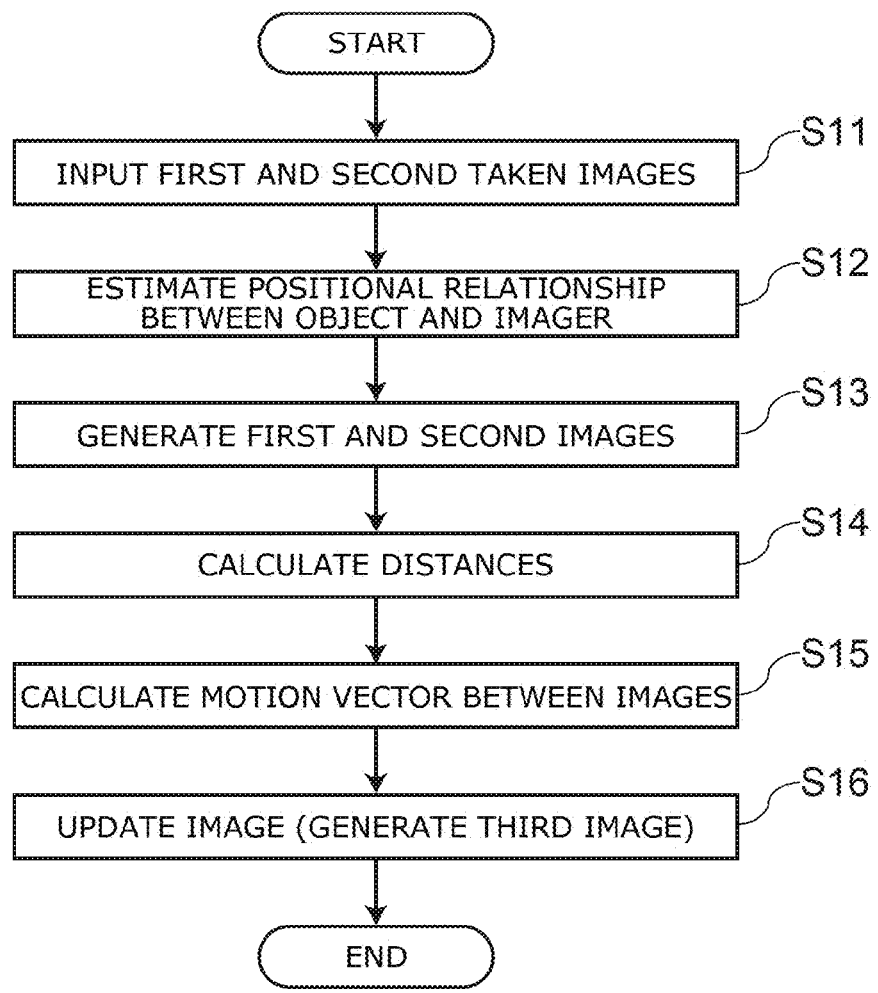
FIG. 11 is a flowchart illustrating an image processing method according to the third embodiment.

FIG. 11 is a flowchart illustrating an image processing method according to the third embodiment.

In the steps S11 through S13 related to the embodiment, two ortho-images (the first generated image 305 and the second generated image 313) are generated based on the first taken image 302 and the second taken image 302a. The second taken image 302a includes the object image 103f, and is different from the first taken image 302. In the step S14, ranges in the real space corresponding respectively to the image areas of the first generated image 305, and distances in the real space corresponding respectively to the image areas of the second generated image 313 are calculated. The first generated image 305 and the second generated image 313 obtained in the step S13 are used as the input of the motion vector calculator 24.

The motion vector calculator 24 calculates (step S15) the motion vector V1 between the two ortho-images, namely the first generated image 305 and the second generated image 313.

Figure 12:
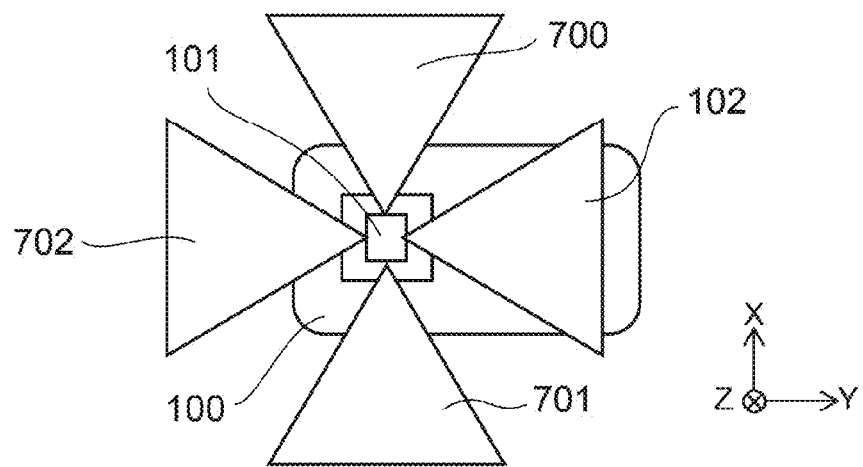
FIG. 12 is a schematic diagram illustrating an appearance of the moving object observed from above.

FIG. 12 is a schematic diagram illustrating an appearance of the moving object observed from above.

In this example, the imager 101 observes four directions different from each other, and there are set regions 700, 701 in the leftward and rightward directions, a region 702 in the backward direction in addition to the region 102 as the observation range in the frontward direction. Further, instead of the different directions, it is also possible to perform imaging at respective time points different from each other, or at respective places different from each other. For example, there can also be adopted the images taken at the respective time points different from each other, namely before and after the movement of the moving object 100. Further, it can also be adopted a combination of any two or more of the directions different from each other, the time points different from each other, and the places different from each other.

Figure 13:
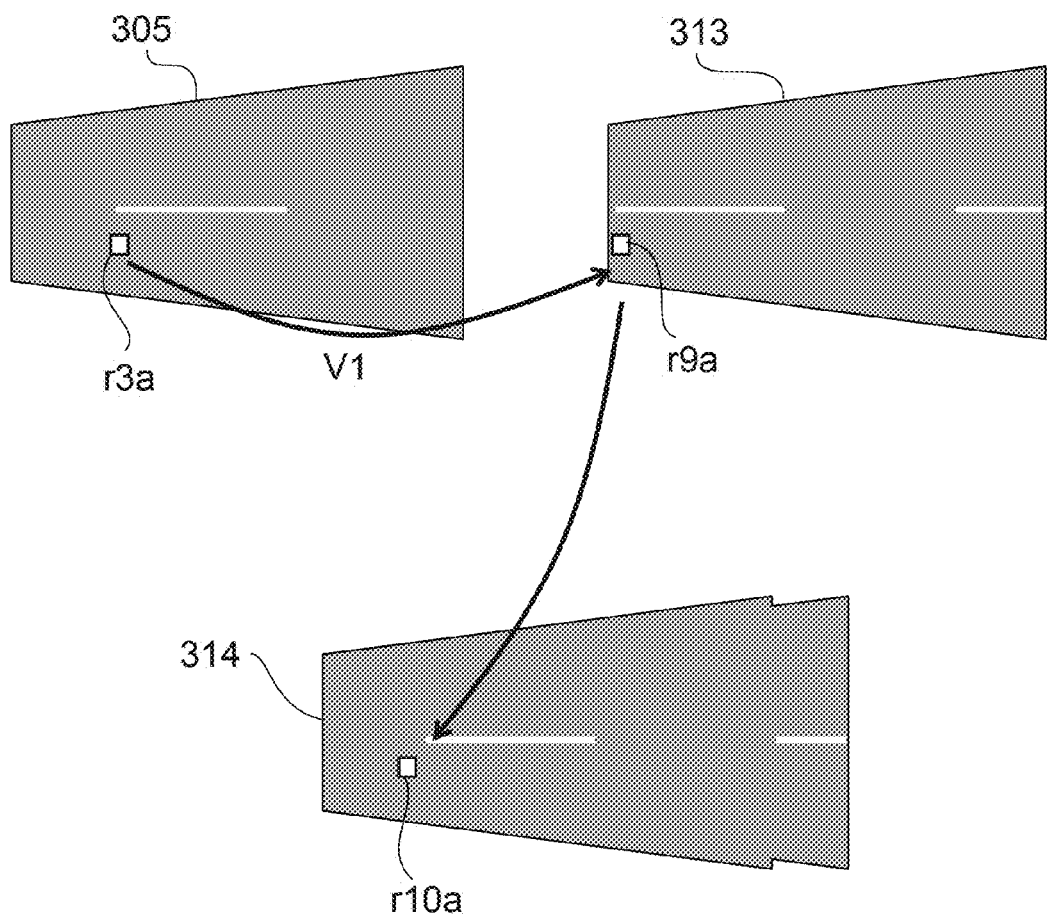
FIG. 13 is a schematic diagram illustrating the motion vector obtained from the plurality of ortho-images.

FIG. 13 is a schematic diagram illustrating the motion vector obtained from the plurality of ortho-images.

In this example, there is shown the second generated image 313 taken by the moving object 100 after moving frontward with respect to the first generated image 305 obtained in the region 102. The two-dimensional motion vector V1 as the moving amount between before and after the movement is calculated. The two-dimensional motion vector having the highest similarity can be calculated using, for example, a template matching method based on the pixel values of the two ortho-images, namely the first generated image 305 and the second generated image 313. Further, it is also possible to calculate the motion vector formed of a rotation amount. Further, it is also possible to obtain the motion of the imager 101 in the three-dimensional space using a structure from motion method on the image, which can be obtained from the imager 101, and then convert the motion into the motion vector using the positional relationship between the imager 101 and the object 103. Further, it is also possible to use an inertial sensor or a global navigation satellite system (GNSS) such as a global positioning system (GPS).

The image updater 25 generates (step S16) the third generated image 314 from the first generated image 305 and the second generated image 313 using the motion vector V1 calculated in the step S15.

As shown in FIG. 13, the motion vector V1 is obtained between the first generated image 305 and the second generated image 313. The motion vector V1 includes the difference between the position of a third image area r3a and the position of a ninth image area r9a. Thus, one third generated image 314 can be generated using these two images, namely the first generated image 305 and the second generated image 313. In the third generated image 314, a tenth image area r10a corresponds to the first position p1. On this occasion, the image short in distance is preferable since a detailed image pattern on the object 103 can further be observed. Therefore, the pixel values in the third generated image 314 are determined so that the pixel values of the image shorter in distance become predominant out of the first generated image 305 and the second generated image 313. The expression "to become predominant" can include the case in which, for example, the pixel values of one shorter in distance out of the pixel values of the first generated image 305 and the pixel values of the second generated image 313 are directly used as the pixel values of the third generated image 314. Further, it is also possible to determine coefficients so that the shorter in distance the image is, the heavier the weight of the image is, and then calculate the pixel values by multiplying the pixel values of the images by the coefficients, respectively.

Here, it is also possible to update the distance map 305a based on the distances in the real space at the respective positions of the third generated image 314. For example, the update is performed using smaller one of the first distance L1 of the first generated image 305 and the fifth distance L5 of the second generated image 313. It is also possible to perform the update using the average value of the first distance L1 and the fifth distance L5. It is also possible to perform the update using a value intermediate between the first distance L1 and the fifth distance L5. Alternatively, it is also possible to perform the update using any two or more values out of these values.

It is also possible to perform detection of abnormity such as cracks on the road surface using the ortho-image and the distance map generated (updated) in the step S16. Further, the ortho-image and the distance map can also be used for the compression of the image. Further, it is also possible to perform detection of the abnormity on the ortho-image thus compressed.

According to the embodiment, since the ortho-image (and the distance map) can be updated to one shorter in distance (higher in spatial resolution), it becomes possible to further improve the accuracy in detecting the cracks on the road surface.

Fourth Embodiment

Figure 14:
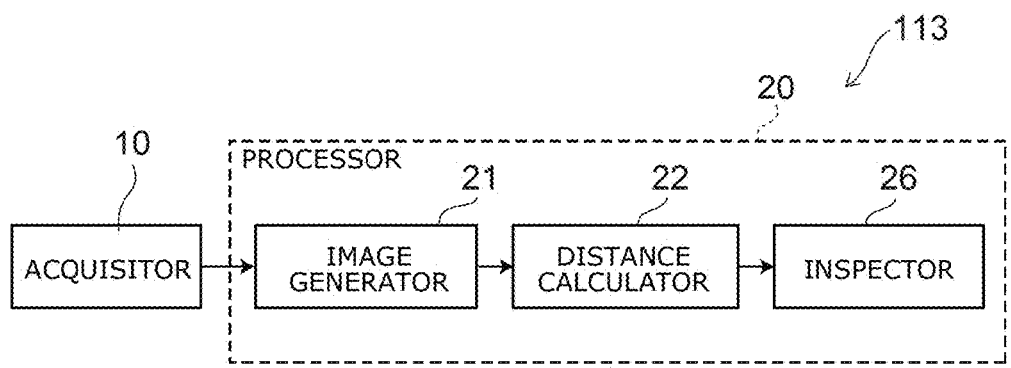
FIG. 14 is a block diagram illustrating an inspection device according to a fourth embodiment.

FIG. 14 is a block diagram illustrating an inspection device according to a fourth embodiment.

An inspection device 113 according to the embodiment includes the acquisitor 10 and the processor 20. The processor 20 includes the image generator 21, and the distance calculator 22, and further includes an inspector 26.

The image generator 21 generates the first generated image 305. The first generated image 305 includes the third image area r3 corresponding to the first position p1, and the fourth image area r4 corresponding to the second position p2. The image generator 21 determines the third pixel value of the third image area r3 based on the information 30 and the first pixel value of the first image area r1, and the fourth pixel value of the fourth image area r4 based on the information 30 and the second pixel value of the second image area r2.

The distance calculation section 22 calculates the first distance L1 in the real space corresponding to the length d1 of the third image area r3 in the Y-axis direction, and the second distance L2 in the real space corresponding to the length d2 of the fourth image area r4 in the Y-axis direction. The length d1 is equal to the length d2, and the first distance L1 is different from the second distance L2.

The inspector 26 performs an inspection process. In the inspection process, whether or not the first distance L1 is equal to or shorter than a predetermined value is determined. In the case in which the first distance L1 is equal to or shorter than the predetermined value, abnormity of the first part 103a of the object 103 is inspected. In the inspection process, whether or not the second distance L2 is equal to or shorter than a predetermined value is determined. In the case in which the second distance L2 is equal to or shorter than the predetermined value, abnormity of the second part 103b of the object 103 is inspected. In other words, the inspector 26 inspects abnormity of the object 103 taking the image area, which has the distance equal to or shorter than a predetermined value out of the third image area r3 and the fourth image area r4, as the inspection target area. It should be noted that the image area in which the distance exceeds a predetermined value is not taken as the inspection target area, but is excluded from the inspection target.

For example, in the inspection process, the pattern analysis is performed based on the pixel values in an area including the third image area r3 to thereby detect the abnormity. The abnormity includes at least either one of cracks, tracks, defects, water leakage, exfoliation, and rust of the first part 103a. In the inspection process, the pattern analysis is performed based on the pixel values in an area including the fourth image area r4 to thereby detect the abnormity. The abnormity includes at least either one of cracks, tracks, defects, water leakage, exfoliation, and rust of the second part 103b.

Figure 15:
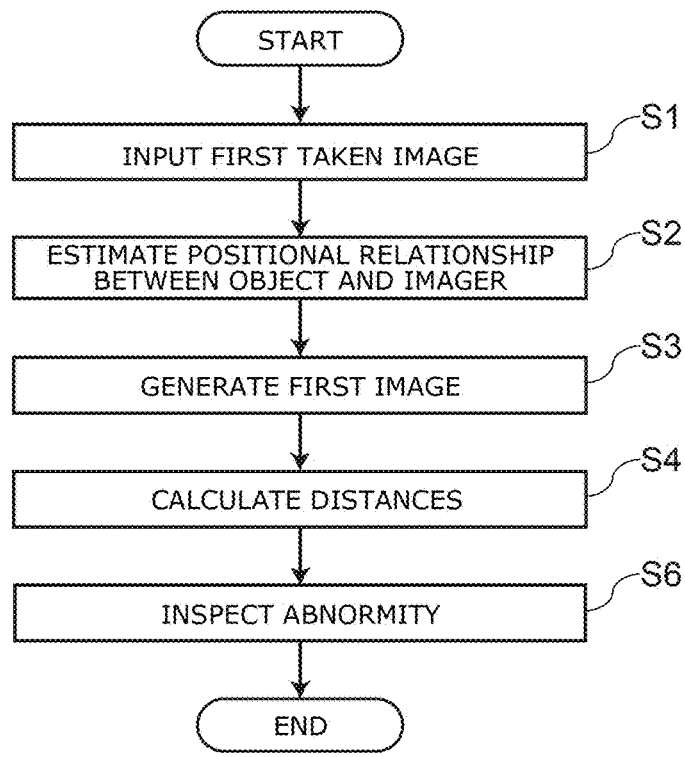
FIG. 15 is a flowchart illustrating an inspection method according to the fourth embodiment.

FIG. 15 is a flowchart illustrating an inspection method according to the fourth embodiment.

The steps S1 through S4 related to the embodiment are already explained in the description of the first embodiment, and therefore, the explanation here will be omitted. The first generated image 305 obtained in the step S3 and the distance map 305a obtained in the step S4 are used as the input of the inspector 26.

The inspector 26 inspects (step S6) abnormity of the object 103 using the first generated image 305 and the distance map 305a.

In the inspection of the abnormity, in the case of using a so-called visible camera capable of receiving the visible light region as the imager 101, detection of cracks, defects (e.g., tracks) from the reference shape, rust, water leakage, and so on can be performed. Further, in the case of using a thermal camera as the imager 101, detection of water leakage, exfoliation, cracks, and so on can be performed. Water leakage and exfoliation cause difference in temperature compared to a place where the water leakage or the exfoliation do not occur.

In order to perform the accurate and reliable abnormity inspection, it is necessary to perform the detection process after identifying the range where the abnormal place to be detected surely shows up. As described with respect to the step S4, in the image areas distant from the imager 101, the distance in the real space is made longer. In the image areas long in distance, cracks thin in width become to fail to show up. As described above, in the image areas which cannot be imaged by the imager 101, the accuracy in the abnormity detection is degraded, and thus, the reliability is lowered.

Therefore, the range in which the abnormity having a size to be detected shows up is identified using the distance map 305a. In identifying the range, Formula 10 is used. Specifically, in the case in which a value Iq of the position (u, v) in the distance map 305a is equal to or smaller than a minimum size T of the abnormal place to be detected, a mask value Imask for setting the presence or absence of the mask is set to 1 to show the fact that the pixel is a detection target. In other cases, the mask value Imask is set to 0 showing the fact that the pixel is not a detection target.

Formula 10

$$I_{mask}(u, v) = \begin{cases} 1 & I_q(u, v) \le T \\ 0 & I_q(u, v) > T \end{cases} \quad (10)$$

In the detection of the abnormal place, the abnormity detection is performed based on the pixel values in the first generated image 305 with respect to the image areas in which the mask value Imask is 1. Since cracks are observed as lines in the image, in the crack detection, it is also possible to perform the detection by, for example, performing a filtering treatment on the first generated image 305, and then extracting a linear shape in which the pixel values are similar to each other. Further, it is also possible to arrange that the characteristic value such as a luminance gradient histogram is calculated from the pattern of the crack, and then, the crack pattern and a non-crack pattern are distinguished from each other. The pattern discrimination can be learned using a support vector machine (SVM), a neural network, a random forest, and so on. In the detection of water leakage, exfoliation, deformations (e.g., tracks) from the reference shape, and so on, it is also possible to label an area different in pixel value from the surroundings, or to perform pattern recognition. Further, the size of a filter used for filtering can also be changed in accordance with the distance diff. For example, in the case in which the distance diff is long, it is also possible to perform the treatment with the filter large in size.

According to the embodiment, it is possible to calculate the distance (the spatial resolution) in the real space at each of the positions of the ortho-image. Therefore, it becomes possible to perform the abnormity inspection such as the crack detection narrowing down to the image area having the necessary spatial resolution. Therefore, the abnormity inspection high in accuracy becomes possible.

Fifth Through Seventh Embodiments (5) The image processing device is used as a road surface diagnostic device for detecting cracks and defects on the road surface using a camera mounted on the ceiling of a vehicle. By using the image processing device according to the embodiment, the abnormity detection high in reliability becomes possible. Since the abnormity on the road surface is detected, the object has a planar shape. By integrating the plurality of ortho-images, a panoramic image of the road surface high in resolution is generated. Further, since the compression size is controlled so as not to affect the abnormity detection, the data generation suitable for the management in the data server becomes possible.

(6) A camera is attached to the moving object moves in a tunnel, and the image processing device is used as a device for making a diagnosis of cracks, defects, water leakage, and exfoliation of the inside wall of the tunnel. By using the image processing device according to the embodiment, the diagnosis high in reliability becomes possible in the tunnel. The ortho-image obtained by developing the cylindrical shape of the tunnel into a planar shape is generated.

(7) It becomes possible to image a bridge by a camera provided to a vehicle or an air vehicle to generate, for example, an ortho-image of a lower surface of the bridge. It is possible to perform detection of rust, cracks, deformation, and so on of the bridge.

It is possible for the image processing device and the inspection device according to the embodiment to be provided with a control device such as a CPU, a storage device such as a ROM and a RAM, an external storage device such as a hard disk drive (HDD) or a solid state drive (SSD), a display device such as a display, an imaging device such as a camera, and so on. The image processing device and the inspection device are arranged to be realized by a hardware configuration using a general computer. Further, each of the constituents constituting the processor can be realized as software or hardware.

Although the description is hereinabove presented illustrating the image processing device, the inspection device, and the image processing method as the embodiments, the embodiments can be modified to a configuration of an image processing program for making a computer perform the image processing method, or a configuration of a computer readable recording medium storing the image processing program.

As the recording medium, there can specifically be assumed a CD-ROM (-R/-RW), a magneto optical disk, a hard disk (HD), a DVD-ROM (-R/-RW/-RAM), a flexible disk (FD), a flash memory, a memory card, a memory stick, other various types of ROM and RAM, and so on, and by storing the image processing program for making a computer perform the image processing method according to the embodiments described above in these recording media and then distributing the recording media, the method is easily implemented. Further, by mounting such recording media as described above to the information processing device such as a computer, and then reading the image processing program by the information processing device, or by storing the image processing program in the storage medium provided to the information processing device, and then reading the image processing program as required, the image processing method according to the embodiments can be performed.

According to the embodiments, an image processing device, an inspection device, an image processing method, and a non-transitory recording medium high in accuracy can be provided.

Hereinabove, embodiments of the invention are described with reference to specific examples. However, the invention is not limited to these specific examples. For example, one skilled in the art may similarly practice the invention by appropriately selecting specific configurations of components such as the acquisitor and the processor, etc., from known art; and such practice is within the scope of the invention to the extent that similar effects can be obtained.

Further, any two or more components of the specific examples may be combined within the extent of technical feasibility and are included in the scope of the invention to the extent that the purport of the invention is included.

Moreover, all image processing devices, inspection devices, image processing methods, and non-transitory recording mediums practicable by an appropriate design modification by one skilled in the art based on the image processing device, the inspection device, the image processing method, and the non-transitory recording medium described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An inspection device comprising:
an input/output (I/O) interface configured to acquire information including
a first taken image including a first image of an object disposed in a real space, the first image including a first image area and a second image area, the first image area corresponding to a first position of a first part of the object and having a first pixel value, the second image area corresponding to a second position of a second part of the object and having a second pixel value, and
a first relationship between a position of the first image area and the first position; and
a processor configured to perform
first image generation processing to generate a first generated image including a third image area corresponding to the first position and a fourth image area corresponding to the second position, and projecting the object on a first plane, to determine a third pixel value of the third image area based on the information and the first pixel value, and to determine a fourth pixel value of the fourth image area based on the information and the second pixel value,
first distance calculation processing to calculate a first distance in the real space corresponding to a length of the third image area in a first direction and a second distance in the real space corresponding to a length of the fourth image area in the first direction, the length of the third image area in the first direction being equal to the length of the fourth image area in the first direction, and the first distance being different from the second distance, and
inspection processing to inspect abnormity of the first part of the object when the first distance is one of equal to and shorter than a predetermined value.

2. The device according to claim 1, wherein
the first image area is an area of one of pixels of the first taken image,
the second image area is an area of another of the pixels of the first taken image,
the third image area is an area of one of pixels of the first generated image, and
the fourth image area is an area of another of the pixels of the first generated image.

3. The device according to claim 1, wherein
the information related to the first relationship includes imaging parameters of a camera having imaged the object, the imaging parameters including a focal distance of the camera and an image center position of the camera, and the first position is a position obtained by performing a coordinate conversion on the position of the first image area based on the imaging parameters.

4. The device according to claim 1, wherein
the processor is further configured to perform image compression processing to compress the first generated image, and
the image compression processing includes setting a compression ratio in the third image area to be higher than a compression ratio in the fourth image area, when the first distance is longer than the second distance, and setting the compression ratio in the third image area to be lower than the compression ratio in the fourth image area, when the first distance is shorter than the second distance.

5. The device according to claim 1, wherein
the information further includes
 a second taken image including a second image of the object and being different from the first taken image, the second image including a fifth image area and a sixth image area, the fifth image area corresponding to a third position of a third part of the object and having a fifth pixel value, the sixth image area corresponding to a fourth position of a fourth part of the object and having a sixth pixel value, and
 a third relationship between a position of the fifth image area and the third position, and
the processor is further configured to perform
 second image generation processing to generate a second generated image including a seventh image area corresponding to the third position and an eighth image area corresponding to the fourth position, and projecting the object on a second plane, to determine a seventh pixel value of the seventh image area based on the information and the fifth pixel value of the fifth image area, and to determine an eighth pixel value of the eighth image area based on the information and the sixth pixel value,
 second distance calculation processing to calculate a third distance in the real space corresponding to a length of the seventh image area in the first direction and a fourth distance in the real space corresponding to a length of the eighth image area in the first direction, the length of the seventh image area in the first direction being equal to the length of the eighth image area in the first direction, and the third distance being different from the fourth distance,
 motion vector calculation processing to detect a ninth image area corresponding to the third image area in the second generated image and having a ninth pixel value, and to calculate a motion vector including a difference between a position of the third image area and a position of the ninth image area, a length of the ninth image area in the first direction corresponding to a fifth distance in the real space, and
 third image generation processing to generate a third generated image including a tenth image area corresponding to the first position, and projecting the object on the second plane, based on the first generated image, the second generated image, and the motion vector, and
the processor is further configured to set
 a pixel value in the tenth image area to the third pixel value, when the first distance is shorter than the fifth distance, and
 the pixel value in the tenth image area to the ninth pixel value, when the first distance is one of equal to and longer than the fifth distance.

6. The device according to claim 1, wherein
the inspection processing includes detecting the abnormity by performing a pattern analysis based on pixel values in an area including the third image area, and
the abnormity includes at least either one of a crack, a track, a defect, water leakage, exfoliation, and rust of the first part.

7. An image processing method, comprising:
acquiring information including
 a first taken image including a first image of an object disposed in a real space, the first image including a first image area and a second image area, the first image area corresponding to a first position of a first part of the object and having a first pixel value, the second image area corresponding to a second position of a second part of the object and having a second pixel value, and
 a first relationship between a position of the first image area and the first position;
generating a first generated image including a third image area corresponding to the first position and a fourth image area corresponding to the second position, and projecting the object on a first plane, determining a third pixel value of the third image area based on the information and the first pixel value, and determining a fourth pixel value of the fourth image area based on the information and the second pixel value;
calculating a first distance in the real space corresponding to a length of the third image area in a first direction and a second distance in the real space corresponding to a length of the fourth image area in the first direction, the length of the third image area in the first direction being equal to the length of the fourth image area in the first direction, and the first distance being different from the second distance; and
inspecting abnormity of the first part of the object when the first distance is one of equal to and shorter than a predetermined value.

8. The method according to claim 7, wherein
the first image area is an area of one of pixels of the first taken image,
the second image area is an area of another of the pixels of the first taken image,
the third image area is an area of one of pixels of the first generated image, and
the fourth image area is an area of another of the pixels of the first generated image.

9. The method according to claim 7, wherein
the information related to the first relationship includes imaging parameters of a camera having imaged the object, the imaging parameters including a focal distance of the camera and an image center position of the camera, and
the first position is a position obtained by performing a coordinate conversion on the position of the first image area based on the imaging parameters.

10. The method according to claim 7, further comprising
setting a compression ratio in the third image area to be higher than a compression ratio in the fourth image area, when the first distance is longer than the second distance, and setting the compression ratio in the third image area to be lower than the compression ratio in the fourth image area, when the first distance is shorter than the second distance.

11. The method according to claim 7, wherein the information further includes a second taken image including a second image of the object and being different from the first taken image, the second image including a fifth image area and a sixth image area, the fifth image area corresponding to a third position of a third part of the object and having a fifth pixel value, the sixth image area corresponding to a fourth position of a fourth part of the object and having a sixth pixel value, and a third relationship between a position of the fifth image area and the third position, and the method further comprises generating a second generated image including a seventh image area corresponding to the third position and an eighth image area corresponding to the fourth position, and projecting the object on a second plane, and determining a seventh pixel value of the seventh image area based on the information and the fifth pixel value of the fifth image area, and determining an eighth pixel value of the eighth image area based on the information and the sixth pixel value, calculating a third distance in the real space corresponding to a length of the seventh image area in the first direction and a fourth distance in the real space corresponding to a length of the eighth image area in the first direction, the length of the seventh image area in the first direction being equal to the length of the eighth image area in the first direction, and the third distance being different from the fourth distance, detecting a ninth image area corresponding to the third image area in the second generated image and having a ninth pixel value, and calculating a motion vector including a difference between a position of the third image area and a position of the ninth image area, a length of the ninth image area in the first direction corresponding to a fifth distance in the real space, and generating a third generated image including a tenth image area corresponding to the first position, and projecting the object on the second plane, based on the first generated image, the second generated image, and the motion vector, and setting a pixel value in the tenth image area to the third pixel value, when the first distance is shorter than the fifth distance, and setting the pixel value in the tenth image area to the ninth pixel value, when the first distance is one of equal to and longer than the fifth distance.

12. The method according to claim 7, wherein the abnormity inspecting comprises performing a pattern analysis based on pixel values in an area including the third image area, and the abnormity includes at least either one of a crack, a track, a defect, water leakage, exfoliation, and rust of the first part.

* * * * *